(12) United States Patent
Nakayama et al.

(10) Patent No.: US 6,244,956 B1
(45) Date of Patent: Jun. 12, 2001

(54) GAME SYSTEM FOR DISPLAYING A PREDICTED POSITION TO TAKE A GIVEN ACTION AGAINST AN OBJECT

(75) Inventors: Norio Nakayama; Kazuhiro Nanba; Masatoshi Yamaoka; Satoko Naito, all of Osaka (JP)

(73) Assignee: Konami Computer Entertainment Co., Ltd., Osaka (JP)

( * ) Notice: Subject to any disclaimer, the term of this patent is extended or adjusted under 35 U.S.C. 154(b) by 0 days.

(21) Appl. No.: 09/627,735

(22) Filed: Jul. 28, 2000

(30) Foreign Application Priority Data

Jul. 30, 1999 (JP) .................................................. 11-218177

(51) Int. Cl.[7] ...................................................... A63F 13/00
(52) U.S. Cl. ....................... 463/3; 463/3; 463/7; 463/31; 463/36
(58) Field of Search .................................. 463/2, 3, 7, 23, 463/31, 36, 37, 38, 43, 44; 345/418, 433, 473, 156, 157, 163, 161, 159, 167, 173

(56) References Cited

U.S. PATENT DOCUMENTS

| 4,672,541 | * | 6/1987 | Bromley et al. . |
| 5,080,377 | * | 1/1992 | Stamper et al. . |
| 5,435,554 | * | 7/1995 | Lipson . |
| 5,601,487 | * | 2/1997 | Oshima et al. . |
| 5,947,819 | * | 9/1999 | Ohshima . |
| 6,102,803 | * | 8/2000 | Takeda et al. . |
| 6,120,374 | * | 9/2000 | Akada et al. . |
| 6,152,821 | * | 11/2000 | Nakagawa et al. . |

* cited by examiner

*Primary Examiner*—Michael O'Neill
(74) *Attorney, Agent, or Firm*—Bachman & LaPointe, P.C.

(57) ABSTRACT

A pitcher character and a batter character are displayed on a browser image. The pitcher character throws a ball at a random speed in a random course. A behavior of the batter character is controlled through operation of a mouse by a player. Specifically, the player predicts a ball passing position and moves a pointer of the mouse to set a meet cursor at the predicted position on the browser image. The batter character swings a bat at the timing of the player clicking the mouse Depending on an overlap state between the meet cursor and the ball, it is judged whether or not the player has hit a home run. Resultant data of a game is sent to a server system along with identification information of the player. The server system totalizes resultant data to derive the total record per player, and produces a game award to be given to each player whose total record deserves it.

15 Claims, 6 Drawing Sheets

FIG.7

TOTAL RANKING

CURRENT HIGHEST AVERAGE    0.411      CURRENT RANKING-IN AVERAGE    0.185

| ORDER | MARK | NICKNAME | HR AVG | NUMBER OF TIMES AT BAT | NUMBER OF HRs | POWER | MEET | UP/DOWN |
|---|---|---|---|---|---|---|---|---|
| 1 | ◎ | aaa | 0.411 | 350 | 62 | 9 | 4 | ⇧ |
| 2 |  | bbb | 0.400 | 280 | 112 | 9 | 2 | ⬇ |
| 3 |  | ccc | 0.358 | 120 | 43 | 4 | 1 | ⇧ |
| 4 |  | ddd | 0.355 | 180 | 64 | 10 | 1 | ⬇ |
| 5 |  | eee | 0.300 | 160 | 48 | 6 | 1 | ⇧ |
| 6 |  | fff | 0.297 | 620 | 184 | 2 | 6 | ⬇ |
| 7 |  | ggg | 0.280 | 450 | 126 | 4 | 4 | ⇧ |
| 8 |  | hhh | 0.280 | 150 | 42 | 2 | 1 | ⇧ |
| 9 |  | iii | 0.278 | 820 | 228 | 3 | 8 | ⬇ |
| 10 |  | jjj | 0.260 | 540 | 140 | 2 | 5 | ⇧ |
| 11 |  | kkk | 0.250 | 380 | 95 | 3 | 2 | ⇧ |
| 12 |  | mmm | 0.228 | 410 | 93 | 4 | 4 | ⬇ |
| 13 |  | nnn | 0.21 | 180 | 38 | 1 | 1 | ⇧ |
| 14 |  | ooo | 0.209 | 220 | 46 | 2 | 2 | ⇧ |
| 15 |  | ppp | 0.205 | 200 | 41 | 3 | 2 | ⬇ |
| 16 |  | qqq | 0.200 | 400 | 80 | 2 | 4 | ⇧ |

GAME SYSTEM FOR DISPLAYING A PREDICTED POSITION TO TAKE A GIVEN ACTION AGAINST AN OBJECT

BACKGROUND OF THE INVENTION

1. Field of the Invention

The present invention relates to a technique for playing a game, such as a competition game, e.g. a baseball game, using a computer apparatus and a pointing device.

2. Description of the Related Art

It has been widely performed to play games such as tennis, soccer and baseball games using a programmed computer apparatus. The games have a variety of contents, but mostly, a player (operator) controls a motion or behavior of a player character using a data input unit, and a score is determined depending on how properly the player controls the behavior of the player character relative to a ball coming from a counterpart character controlled by a computer apparatus or a counterpart player. For example, in case of a baseball game, a score is determined depending on how well a batter character as a player character hits back a ball thrown by a pitcher character as a counterpart character.

In this event, the operation contents of the player mainly include determination of position and posture of the batter character, selection and adjustment of a bat, bat swing timing, bat swing position and bat swing angle. For realizing such operations, a pointing device is normally used, which is connected to a computer apparatus main body. In general, a pointing device detects displacement amounts thereof moved by a player in X and Y coordinate directions to identify a corresponding two-dimensional coordinate position, and notifies the identified coordinate position to a computer apparatus main body. The position of the batter character is determined by identifying this coordinate position. Further, the pointing device produces a timing signal when a switch thereof is pushed by the player at a desired time point and notifies it to the computer apparatus main body. The bat swing timing is determined based on this timing signal.

The computer apparatuses are roughly divided into those which are dedicated for playing games, such as game apparatuses, and those which can be widely used for various purposes, such as personal computers. In the former case, an analog or digital joy-stick or a controller having it is used as a pointing device. The analog joy-stick is provided with a projected member of a given size having a root portion where sensors are disposed for outputting X and Y coordinates as analog values. When a player tilts the projected member using fingers, the analog joy-stick designates a coordinate position in a two-dimensional region according to a tilting operation. On the other hand, the digital joy-stick is normally provided with cross keys having sensors or switches for deriving coordinates in upward, downward, leftward and rightward directions, respectively. When a player continues to depress one or two of the cross keys, the digital joy-stick designates a coordinate position in a two-dimensional region according to a depressing operation.

On the other hand, as pointing devices of personal computers, mice, portable track balls and portable slide pads are normally used. Among them, a mouse or portable track ball is provided with a pair of sensors for detecting displacement magnitudes of X and Y coordinates, respectively, and a ball for simultaneously driving both sensors. When a player rolls the ball in a target direction directly by hand or indirectly via a desk surface, a coordinate position in a two-dimensional region is designated. A slide pad is provided with sensors for detecting contact positions of fingers of a player, a moving direction and magnitude, and designates a coordinate position in a two-dimensional region according to a detection result. In principle, the slide pad realizes the technique of the mouse or track ball in a digital way.

A difference between the pointing devices of the game apparatus and the personal computer mainly resides in handling of a pointer. Specifically, in case of the joy-stick, a pointer is not normally displayed on a screen. This has a merit in view of not spoiling visuality on the screen. As appreciated, data corresponding to a pointer, i.e. a virtual pointer, exists in the game apparatus. This virtual pointer moves as long as a player continues to push the projected member or the cross key/keys. Thus, when moving the virtual pointer in a desired direction by an approximate distance or quickly returning the virtual pointer to a home position, the joy-stick may be a better tool for operation than the pointing devices of the personal computers, such as a mouse. However, data inputted by the joy-stick relates only to a moving direction of the virtual pointer, i.e. a moving magnitude of the virtual pointer only depends on the length of an input time.

On the other hand, in case of the mouse or the like, a pointer is always displayed on a screen. Further, data inputted by the mouse or the like relates to both moving direction and magnitude. Thus, regardless of the length of an input time, a moving direction and magnitude of a pointer can be inputted by one operation. Therefore, when a game requires a quick movement of a pointer to a random position and then requires an action at the moved position, the mouse or the like is better than the joy-stick.

At present, the game apparatuses are more popular than the personal computers as a computer apparatus for playing a game, and thus, game programs also have the contents which are suitable for operation by the pointing devices of the game apparatuses.

However, as described above, since the pointer is not displayed on the screen in the game apparatus, it is difficult for the game apparatus to realize the game wherein the pointer should be moved to a random position quickly and precisely and then an action is required at the moved position. Further, in case of the game apparatuses, only a person who bought it tends to be the sole player, and it is difficult for the game apparatuses to realize a game in which many players join. On the other hand, in case of the personal computers, i.e. general-purpose computer apparatuses, a user range is wide, and further, the personal computers can utilize a network, i.e. a communication infrastructure, more extensively as compared with the game apparatuses.

SUMMARY OF THE INVENTION

Therefore, it is an object of the present invention to provide a game playing method which can be realized in an environment where a game-dedicated apparatus with a joy-stick is unsuitable.

It is another object of the present invention to provide a game playing apparatus for carrying out the foregoing game playing method.

It is another object of the present invention to provide a storage medium storing a game program representing the foregoing game playing method.

According to one aspect of the present invention, there is provided a game playing method executed by a computer apparatus having a pointing device which is capable of simultaneously inputting a moving direction and magnitude of a pointer through one operation of the pointing device by a player and further capable of receiving an input of a signal at a timing of a given operation of the pointing device by the player, the method comprising displaying a predicted position of an object image which appears at a random timing and position, according to a position of the pointer moved by the player via the pointing device; enabling an action to the object image at an input timing of the signal received via the pointing device; judging a degree of success of the action depending on an overlap state between the predicted position and the object image at the time of the action; changing a size of the predicted position depending on at least one of the total number of times of the actions and the total degree of success of actions; and giving a game award to the player depending on the total degree of success of the actions.

It may be arranged that the pointer is displayed in real time at a position intended by the player using the pointing device, and the predicted position follows movement of the displayed pointer.

According to another aspect of the present invention, there is provided a game playing method executed by a computer apparatus having a pointing device which is capable of simultaneously inputting a moving direction and magnitude of a pointer through one operation of the pointing device by a player and further capable of receiving an input of a signal at a timing of a given operation of the pointing device by the player, the method comprising displaying a first and a second character from a viewpoint located at the back of the second character, the first character forcing out an object thing in a random course at a random speed, the second character assuming a given action to the object thing coming from the first character; displaying a predicted position to take the given action against the object thing coming from the first character, in response to movement of the pointer moved by the player via the pointing device; causing the second character to take the given action against the object thing at an input timing of the signal received via the pointing device; judging a degree of success of the given action depending on an overlap state between the predicted position and the object thing at the time of the given action; changing a size of the predicted position depending on at least one of the total number of times of taking the given action and the total degree of success of the given actions; and giving a game award to the player depending on the total degree of success of the given actions.

It may be arranged that the pointer is displayed in real time at a position intended by the player using the pointing device, and the predicted position follows movement of the displayed pointer.

It may be arranged that the first character is a pitcher character, the second character is a batter character, and the object thing is a ball thrown by the pitcher character, and that after setting the predicted position, the batter character swings a bat for hitting the ball at the input timing of the signal.

According to another aspect of the present invention, there is provided a game playing method executed by a plurality of computer apparatuses each having a means for executing a given game program and further having a pointing device which is capable of simultaneously inputting a moving direction and magnitude of a pointer through one operation of the pointing device by a player and further capable of receiving an input of a signal at a timing of a given operation of the pointing device by the player, and further by a server apparatus performing two-way communication with each of the computer apparatuses via a network, the method comprising delivering the game program to each of the computer apparatuses from the server apparatus; executing the game program by at least one of the computer apparatuses to display a first and a second character from a viewpoint located at the back of the second character, the first character forcing out an object thing in a random course at a random speed, the second character assuming a given action to the object thing coming from the first character, to display a predicted position to take the given action against the object thing coming from the first character, in response to movement of the pointer moved by the player via the pointing device, to cause the second character to take the given action against the object thing at an input timing of the signal received via the pointing device, to judge a degree of success of the given action depending on an overlap state between the predicted position and the object thing at the time of the given action, and to send a judgement result on the degree of success of the given action to the server apparatus along with identification information of the player; and totalizing, by the server apparatus, a plurality of judgment results to derive the total result per player, thereby to produce a game ward to be given to each player whose total result deserves the game award.

It may be arranged that the pointer is displayed in real time at a position intended by the player using the pointing device, and the predicted position follows movement of the displayed pointer.

It may be arranged that the first character is a pitcher character, the second character is a batter character, and the object thing is a ball thrown by the pitcher character, and that after setting the predicted position, the batter character swings a bat for hitting the ball at the input timing of the signal.

It may be arranged that the server apparatus stores the total result per player in a memory, and that when one of the players accesses the server apparatus using a computer apparatus other than the previous computer apparatus, the server apparatus reads the total result of the one of the players from the memory.

It may be arranged that the server apparatus causes the computer apparatus to display a page image in which a given item is buried invisible to the player, and to perform a process to enhance the degree of success of the given action by the second character after the player acquires the given item.

According to another aspect of the present invention, there is provided a game computer apparatus comprising a pointing device which is capable of simultaneously inputting a moving direction and magnitude of a pointer through one operation of the pointing device by a player and further capable of receiving an input of a signal at a timing of a given operation of the pointing device by the player; a program acquiring means for acquiring a given game program from a server apparatus connected to the game computer apparatus via a network and for storing the acquired game program into a memory; a program executing means for executing the game program read from the memory to display a first and a second character from a viewpoint located at the back of the second character, the first character forcing out an object thing in a random course at a random speed, the second character assuming a given action to the object thing coming from the first character, to display a predicted position to take the given action against the object thing coming from the first character, in response to movement of the pointer moved by the player via the pointing device, to cause the second character to take the given action against the object thing at an input timing of the signal received via the pointing device, and to judge a degree of success of the given action depending on an overlap state between the predicted position and the object thing at the time of the action; and a game result processing means for sending a judgement result on the degree of success of the given action to the server apparatus along with identification information of the player and for acquiring a game ward produced by the server apparatus based on the total judgement result derived by the server system by totalizing a plurality of judgement results.

According to another aspect of the present invention, there is provided a computer-readable storage medium storing program codes which cause a computer apparatus having a pointing device capable of simultaneously inputting a moving direction and magnitude of a pointer through one operation of the pointing device by a player and further capable of receiving an input of a signal at a timing of a given operation of the pointing device by the player, to execute displaying a first and a second character from a viewpoint located at the back of the second character, the first character forcing out an object thing in a random course at a random speed, the second character assuming a given action to the object thing coming from the first character; displaying a predicted position to take the given action against the object thing coming from the first character, in response to movement of the pointer moved by the player via the pointing device; causing the second character to take the given action against the object thing at an input timing of the signal received via the pointing device; judging a degree of success of the given action depending on an overlap state between the predicted position and the object thing at the time of the action; changing a size of the predicted position depending on at least one of the total number of times of taking the given action and the total degree of success of the given actions; and giving a game award to the player depending on the total degree of success of the given actions.

It may be arranged that the degree of success of the given action is judged based on a probability value which is determined according to an ability value of the player registered in advance and which is updatable.

It may be arranged that the program codes cause the computer apparatus to display the pointer in real time at a position intended by the player using the pointing device, and to control the predicted position to follow movement of the displayed pointer.

It may be arranged that the computer apparatus is a personal computer and the pointing device is one of a mouse, a portable track ball and a portable slide pad.

BRIEF DESCRIPTION OF THE DRAWINGS

The present invention will be understood more fully from the detailed description given hereinbelow, taken in conjunction with the accompanying drawings.

In the drawings:

FIG. 7 is a diagram showing the total ranking of players joining in the home-run competition.

DESCRIPTION OF THE PREFERRED EMBODIMENT

Now, a preferred embodiment of the present invention will be described hereinbelow with reference to the accompanying drawings, wherein operators (players) of personal computers join a home-run competition via the Internet at desired times.

Figure 1:
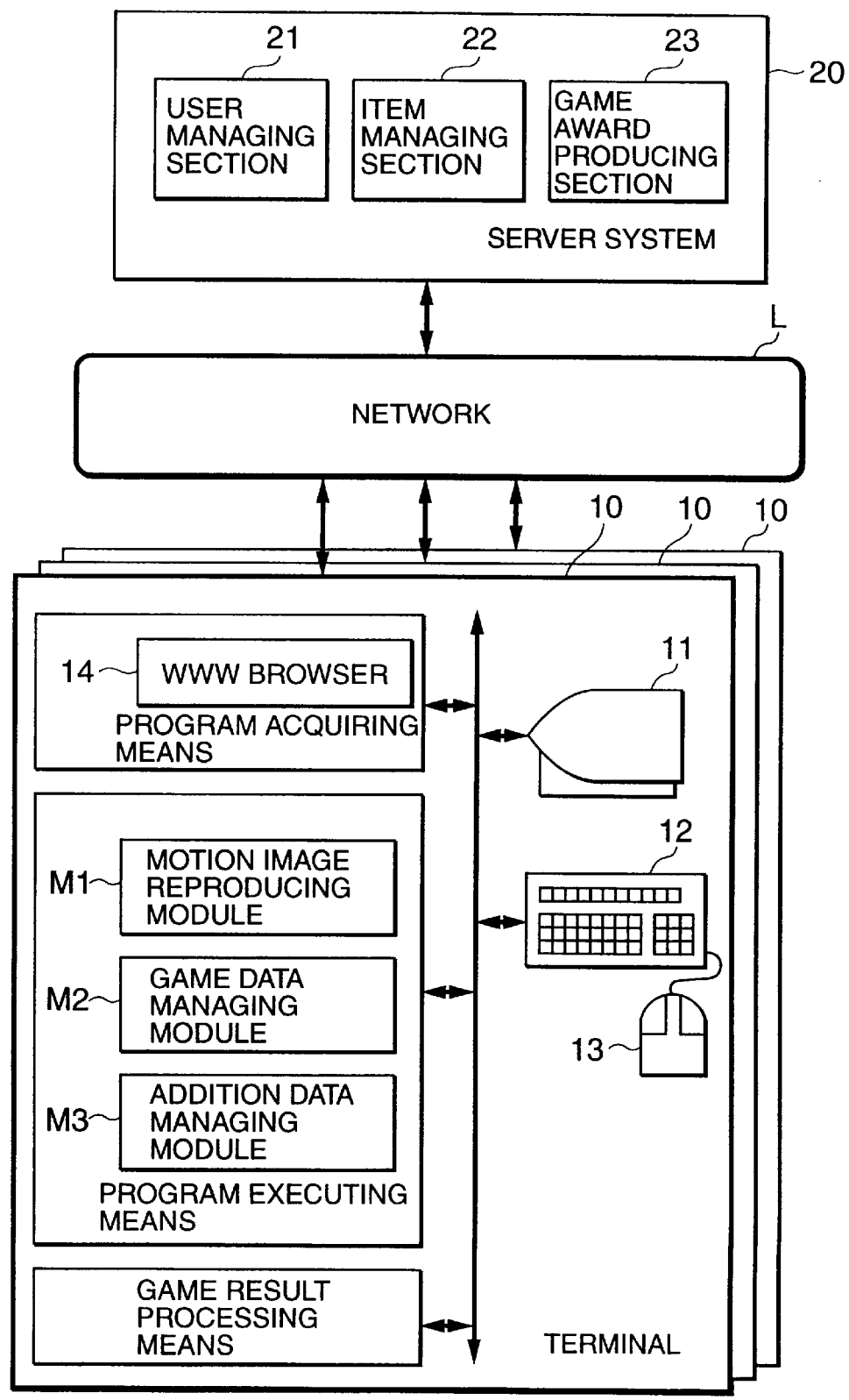
FIG. 1 is a diagram showing the whole structure of a system for playing a home-run competition according to a preferred embodiment of the present invention.

FIG. 1 is a diagram showing the whole structure of a system for playing a home-run competition according to the preferred embodiment of the present invention. The system comprises a plurality of terminals 10 connected to the Internet L, and a server system 20 also connected to the Internet L. Each terminal 10 is in the form of a general-purpose personal computer having a display unit 11, a keyboard 12 and a mouse 13 connected to a computer main body. A WWW browser 14 is loaded in the personal computer, i.e. the computer main body, for connection to the Internet L. In this embodiment, a program acquiring means, a program executing means and a game result processing means are created in the personal computer by the WWW browser 14 and a given game program which will be described hereinbelow.

The program acquiring means first implements an initial registration of the subject terminal 10 to the server system 20, then acquires the game program from a page image offered by the server system and stores it into a memory of the subject terminal 10. A function module as the program acquiring means may be prepared originally, but more easily, a function of the WWW browser 14 may be used as it is for acquiring the game program from the page image of the server system 20.

The game program is composed of a motion image reproducing module M1, a game data managing module M2 and an addition data managing module M3. It is preferable that all the modules exist integrally in the server system 20, but the modules may be stored separately in the server system 20 and other server systems, or may be stored separately in other server systems. In the former case, one URL (uniform resource locator) is described on a page image offered by the server system 20, and a player can acquire all the modules automatically by designating the URL. In the latter case, URLs of the respective modules are described on an page image of the server system 20, and a player can acquire all the modules by designating the respective URLs.

The motion image reproducing module M1 is for reproducing three-dimensional motion images. For example, "Shockwave" of Macromedia Corporation available on the Internet may be used for the motion image reproducing module M1. The game data managing module M2 is for managing original data of motion images reproduced by the motion image reproducing module M1 and various data for developing a story of the game. In this embodiment, the game data managing module M2 manages image data of a pitcher character, a batter character, a ball, a shadow of the ball, a meet cursor representing a predicted meet position, a strike zone, a ball passing position, a home base and a background such as the stands, sound data and text data according to a game rule.

Among the foregoing data, at least the image data is managed to form one display image using a plurality of layers. Specifically, an expression manner such as a motion of a character can be changed per layer. This can reduce the number of the original data upon reproducing motion images. The addition data managing module M3 is for managing addition data relating to the game. The addition data in this embodiment are a power point and a meet point allocated by the server system 20. The power point is a parameter relating to a flying distance of a ball. As the power point increases, the flying distance also increases so that a home run is more likely to be achieved. The meet point is a parameter representing how easily a ball can be hit. As the meet point increases, the meet cursor increases in size so that the ball is more likely to be hit. In this embodiment, one power point is given from the server system 20 when a player seeks out a power item from a page image of the server system 20 and notifies it to the server system 20. Further, in this embodiment, one meet point is given from the server system 20 every time the total number of times of pitching a ball, i.e. the total number of times at bat, reaches one of predetermined values.

The program executing means executes the game data managing module M2 along with the other two modules M1 and M3 thereby to produce various events relating to the home-run competition and calculate a result thereof. Specifically, the program executing means runs the modules M1 to M3 on the WWW browser 14 using a CGI (common gateway interface) of the server system 20 to produce various events. Images and text for the game are all displayed on the browser image, and data transfer between the server system 20 and the player is all performed via the WWW browser 14 and the CGI of the server system 20. The game result processing means cooperates with the modules M1 to M3 to perform a process relating to a result of the home-run competition, specifically, to perform two-way communication with the server system 20 and information presentation to the player.

Program codes for realizing a part or the whole of the foregoing functions of the program executing means and the game result processing means may be prestored in a storage medium such as a CD-ROM, or in a carrier medium identifiable with the form of "signal", and may be loaded into the personal computer before starting the home-run competition.

On the other hand, the server system 20 has functions of a user managing section 21, an item managing section 22 and a game award producing section 23, in addition to a basic server function of offering page images to each terminal 10. These functions are realized by program codes stored in a manner readable by a CPU of the server system 20.

The user managing section 21 manages peculiar information of each player who accessed the server system 20 via a page image, such as the total record in the home-run competition and incentive information per player. The user managing section 21 gives a meet point to each player depending on the record, i.e. the total number of times at bat in this embodiment. Further, if necessary, the user managing section 21 also has a function of carrying out a security check against an access.

The item managing section 22 manages a plurality of power items each for increasing an ability of a batter character operated by a player of each terminal 10. These items are buried invisible to the players in some of page images offered by the server system 20. The item managing section 22 gives a power point to each player upon seeking out a power item.

The game award producing section 23 produces incentive information depending on the record of the home-run competition for each player. The incentive information is awarded to a player who satisfies a predetermined condition of the record. The incentive information is information for giving a player a chance to continue the game and may include various types of information. For example, this may be property or value information, such as a keyword or the like for accessing the site free of charge which would be otherwise accessible for pay.

The incentive information may be set by stages according to the record. In this case, at the initial stage, ranking is carried out for notifying a player of a position of his/her game ability among the other players, while a particular indication is carried out for a player ranked at a stage other than the initial stage.

Now, a procedure for actually performing the home-run competition using the foregoing system will be described with reference to FIGS. 2 to 6. In the home-run competition, while watching a browser image, a player hits back a ball thrown by a pitcher character using a mouse to compete with the other players in degree of hitting a home run (home-run average). The mouse 13 is used in consideration of the fact that a moving direction and magnitude of a pointer can be inputted through one operation so that the pointer can be moved to a random position easily and quickly even if a player is not an expert, that the mouse is the most popular pointing device for operators of personal computers, and that the pointer is displayed at a target position in real time as opposed to a joy-stick so that a predicted meet position can be easily set following the pointer.

Figure 2:
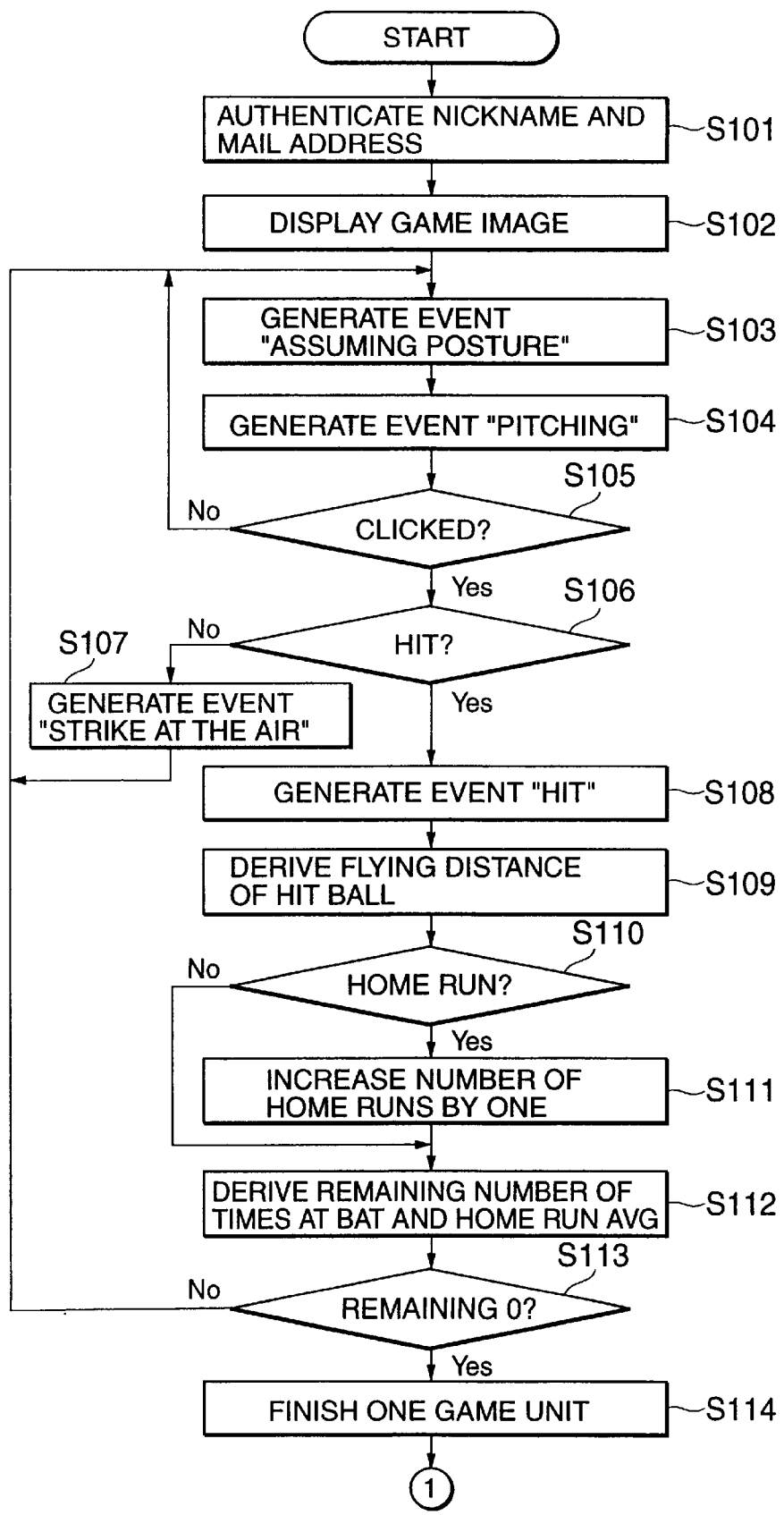
FIGS. 2 and 3 are diagrams showing a flowchart of carrying out a home-run competition according to the preferred embodiment of the present invention.

As shown in FIG. 2, the game starts when a nickname and a mail address of a player which were sent to the server system 20 upon the initial registration are inputted via the keyboard 12 and then authenticated by the server system 20 (step S101).

Figure 4:
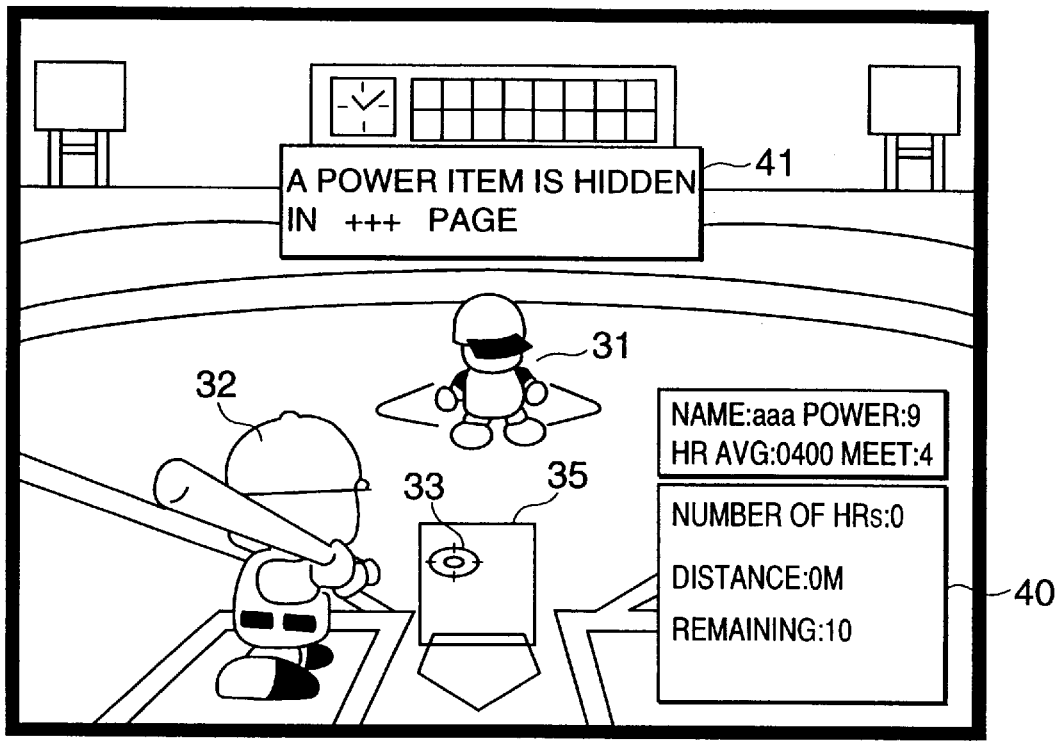
FIG. 4 is a diagram showing an initial game image of the homerun competition.

Then, an initial game image is displayed as shown in FIG. 4 (step S102). Specifically, in the initial game image, a pitcher character 31, a batter character 32 and a background are displayed in a three-dimensional fashion from a viewpoint located at the back of the batter character 32. Further, a meet cursor 33 representing a predicted meet position is displayed in an oval shape, and a strike zone 35 over the home base is displayed in a rectangular frame. At the lower-right side of the screen is displayed a column 40 showing a nickname (NAME), the newest power point (POWER), a home-run average (HR AVG) per game, the newest meet point (MEET), the number of home runs (NUMBER OF HRs) per game, a flying distance (DISTANCE) and the remaining number of times of pitching or at bat relative to the predetermined number of times of pitching or at bat per game (REMAINING). Further, a column 41 is displayed behind the center to introduce page image information for acquiring a power point.

After the start of the game, an event "assuming posture" is started after a lapse of random time when the batter character 32 assumes a posture for batting (step S103). The length of this event changes randomly. Thus, a player joins the game with a feeling of tension from this time. After the event "assuming posture" is finished, the pitcher character 31 starts a pitching motion so that an event "pitching" is generated where a speed and kind of a pitching ball are selected at random (step S 104). The pitching ball speed is set in the range of 80 to 160 km/h, and the pitching ball kind is selected from among 7 kinds such as straight, curve and shoot. After the pitching ball speed and kind are selected, a ball with the selected speed and kind is thrown toward a catcher (not shown) behind the batter character 32. For example, when the ball speed is 160 km/h, a ball passes before the batter character 32 with a lapse of a time which is half a time when the ball speed is 80 km/h. Thus, it is very difficult to predict a timing when the ball reaches the strike zone 35, and a ball passing position within the strike zone 35. In this regard, since the mouse 13 is used, a pointer can be moved to a target position in real time, the meet cursor 33 which follows the pointer can be set quickly for designating a predicted meet position.

Figure 5:
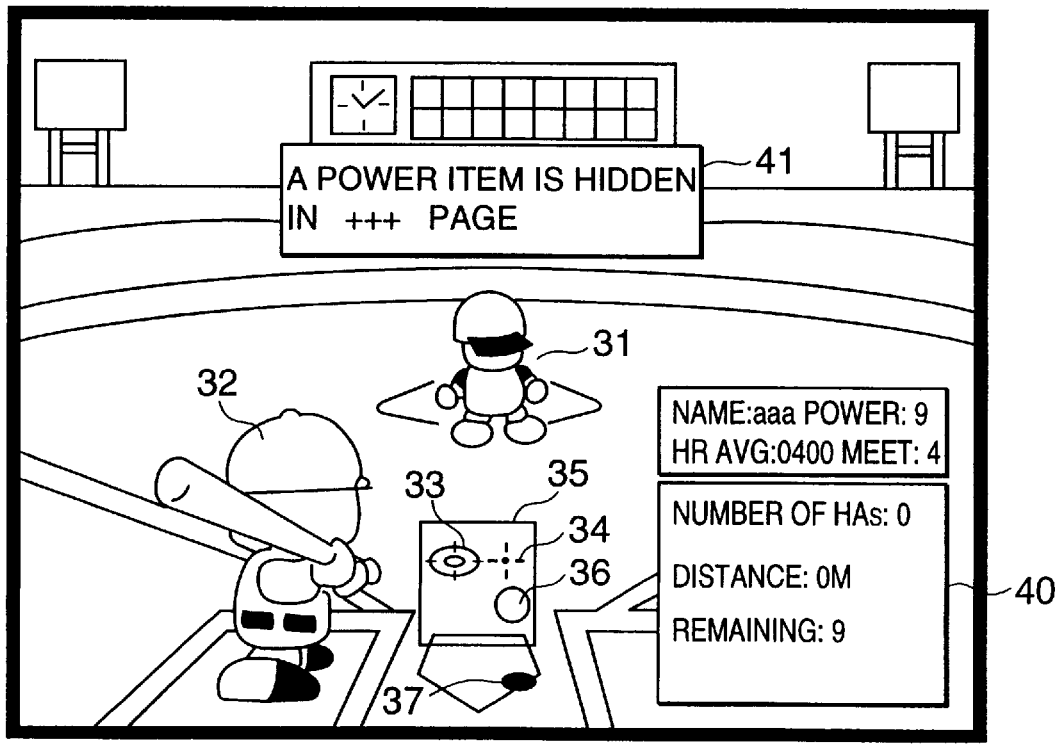
FIG. 5 is a diagram showing a game image for explaining how batting is carried out in the home-run competition.

As shown in FIG. 5, while a shadow of a ball 36 is displayed on the home base, an event is generated. If the player does not click the mouse 13 during this event, i.e. while the shadow of the ball 36 is located on the home base, "letting a pitch go by" is judged and the procedure returns to step S103 (No at step S105).

When the player operates the mouse 13 to move a pointer to a predicted meet position, X and Y coordinates of the pointer are calculated so that the meet cursor 33 is moved thereto. Then, when the player clicks the mouse 13, the batter character 32 swings a bat. If the player clicks the mouse 13 when the meet cursor 33 does not overlap at all with an actual ball passing position 34 (i.e. the ball 36) irrespective of whether or not the shadow of the ball 36 is located on the home base, or when the shadow of the ball 36 is not located on the home base irrespective of whether or not the meet cursor 33 overlaps with the ball passing position 34 (i.e. the ball 36), an event "strike at the air" is generated so that the batter character 32 swings wide with an exaggerated motion. In an example shown in FIG. 5, since the meet cursor 33 does not overlap at all with the ball passing position 34, the event "strike at the air" is generated even though the shadow of the ball 36 is located on the home base. After this event is finished, the procedure returns to step S103 (Yes at step S105: No at step S106: step 107).

On the other hand, if the player clicks the mouse 13 when the meet cursor 33 overlaps with the ball passing position 34 while the shadow of the ball 36 is located on the home base, an event "hit" is generated (Yes at step S105: Yes at step S106: step S108). When this event is generated, a flying distance of the hit ball is calculated based on the power point, the selected ball speed and kind, and a hit position on the ball which is determined based on an overlap state between the meet cursor 33 and the ball passing position 34 (step S109).

It is determined based on a probability value whether or not the hit ball becomes a fly. The probability value is determined by the game data managing module M2 depending on a batting sense a player notified to the server system 20 upon the initial registration. In this embodiment, the meet point is reflected on the probability value so that the probability value is updatable. For enhancing attraction for the game, the power point may also be reflected on the probability value.

After calculation of the flying distance of the hit ball, one of events "grounder", "liner to pitcher", "fly (other than home run)" and "home run" is generated.

Figure 6:
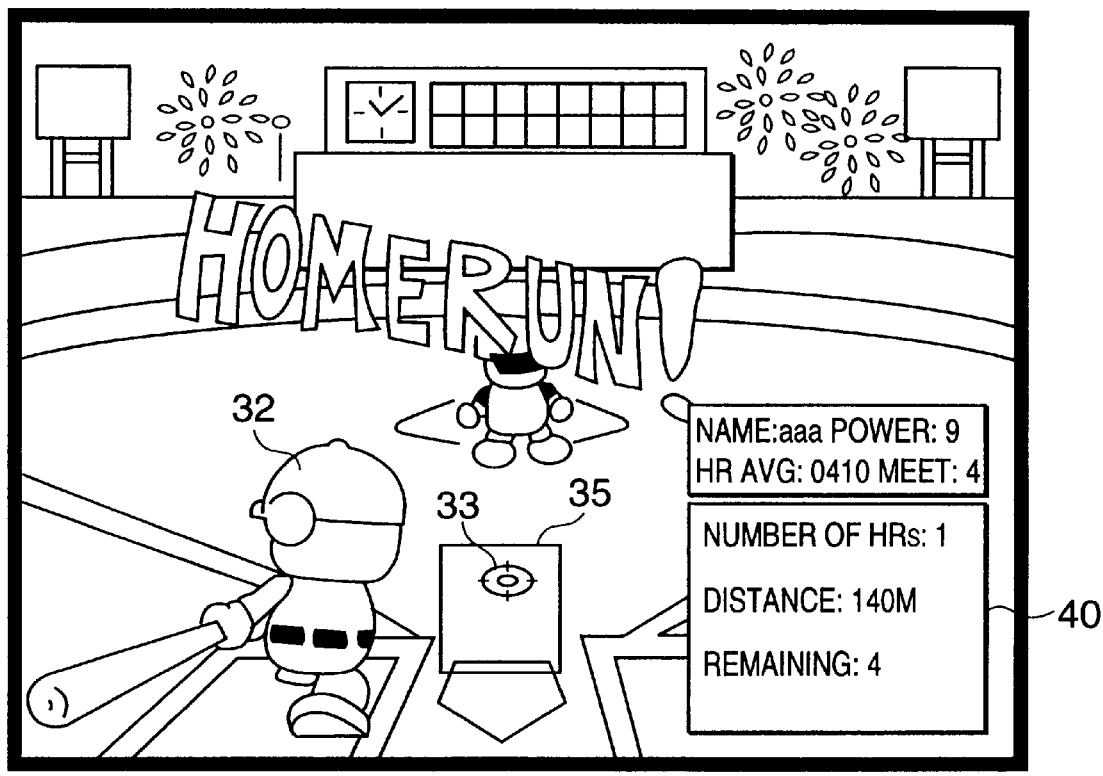
FIG. 6 is a diagram showing a game image when a player hits a home run.

When it is "home run", a background image is changed as shown in FIG. 6 and the number of times of home runs in this game is increased by one (Yes at step S110: step S111). In this embodiment, any batting result other than a home run is judged to be a failure.

Then at step S112, the remaining number of times at bat relative to the predetermined number of times at bat per game is calculated (step S112). If the remaining number of times at bat is not 0 (zero), the procedure from step S103 to step S112 is repeated (No at step S113). On the other hand, when the remaining number of times at bat becomes 0 (zero), one game unit is finished (Yes at step S113: step S114). At step S112, the home-run average in this game is also derived.

Figure 3:
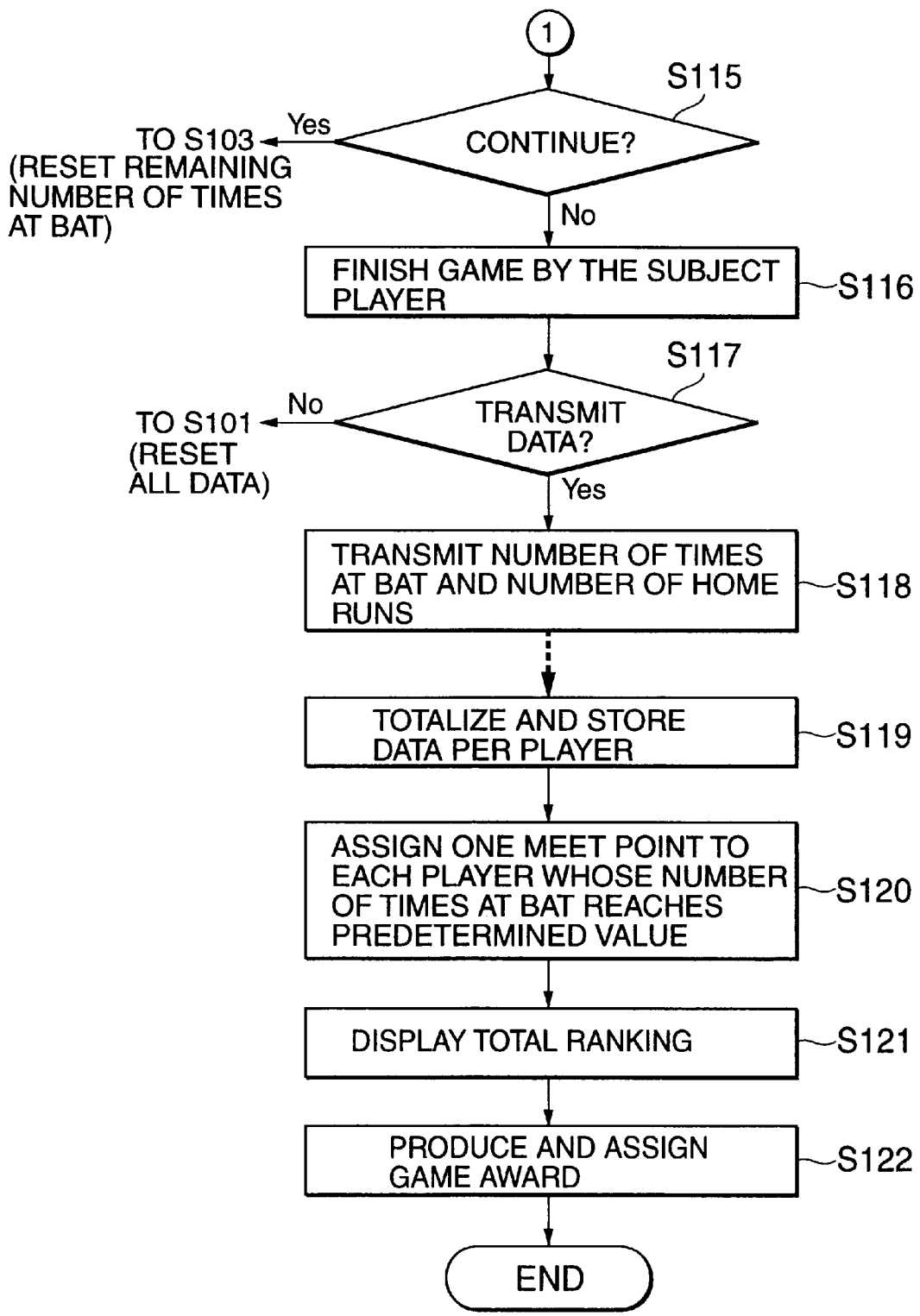

Referring now to FIG. 3, if the player selects to continue (Yes at step S115), the remaining number of times at bat is reset to the predetermined number of times at bat per game, then the procedure returns to step S103 to start another game unit. On the other hand, if negative at step S115, the game by the subject player is finished (No at step S115: step S116). Then at step S117, it is checked whether data obtained through the foregoing steps is sent to the server system 20. If negative at step S117, all the data obtained through the foregoing steps is reset and the procedure returns to step S101. On the other hand, if positive at step S117, the number of times at bat and the number of times of home runs achieved through the foregoing steps are sent to the server system 20 (Yes at step S117: step S118).

The server system 20 totalizes data sent from each terminal 10 to obtain the total record per player, and stores it per player into a memory of the server system 20 (step S119). When the total number of times at bat reaches one of predetermined values, one meet point is given to the corresponding player to increase the total meet point by one (step S120). As the total meet point increases, the meet cursor 33 is enlarged in size so that the ball can be hit more easily. Instead of or along with the total number of times at bat, the meet point may be changed depending on the total home-run average.

Since the total record is stored in the memory of the server system 20 per player, even if the player accesses the server system 20 using a terminal other than the previous terminal, the server system 20 can read the total record of the corresponding player.

As shown in FIG. 7, the server system 20 displays a page image showing the total ranking of the players who have satisfied the required minimum number of times at bat (step S121). The server system 20 further produces game awards to be given to a player with the highest home-run average, a player with the greatest number of times of home runs, and the like, and presents them to the corresponding players via the terminals 10 when they make access to the game awards (step S 122). Determination of players who deserve to receive game awards is carried out per week or month. Up to a reference day, marks are assigned to game award candidates. This may raise an incentive to continue playing the game for each of the players.

As described above, in the foregoing preferred embodiment, the behavior of the batter character 32 is controlled through operation of the mouse 13 while playing the home-run competition. Thus, even if a ball is thrown from the pitcher character 31 at a random ball speed and with a random pitching ball kind, i.e. thus in a random course, the player can quickly respond to a behavior of the ball to hit the ball at a position predicted by the player. Accordingly, a mouse is quite suitable for a game requiring quickness, such as the foregoing home-run competition wherein a player predicts a ball hitting position in a moment and swings a bat at once after setting the ball hitting position.

Further, in the foregoing preferred embodiment, the personal computers having a variety of users are used as the terminals 10, and the server system 20 concentrically manages the records of games played by the terminals 10 according to the game program directly or indirectly delivered from the server system 20 and displays the total ranking of the players. Accordingly, the game playing environment can be easily constructed where many players can join. Also for the players, since each player can know his/her own record relative to the whole and a game award is presented to each player when a predetermined condition is satisfied, an incentive to play the game is enhanced.

In the foregoing preferred embodiment, the mouse 13 is used as a pointing device. However, a portable track ball, a portable slide pad or another pointing device which can simultaneously input a moving direction and magnitude of a pointer through one operation by a player and which can receive an input of a signal at a timing of a given operation by the player, may also be used.

In the foregoing preferred embodiment, the present invention is applied to the home-run competition. However, the present invention is also applicable to those games wherein a predicted position is first determined of an object image which appears at a random position and at a random timing, then an action to the object image is made possible at an input timing of a signal received through a pointing device, and the degree of success of the action is judged depending on an overlap state between the predicted position and the object image at the time of the action. For example, those games may include a penalty kick preventing game in soccer, a service ace game in tennis and a squash game.

While the present invention has been described in terms of the preferred embodiment, the invention is not to be limited thereto, but can be embodied in various ways without departing from the principle of the invention as defined in the appended claims.

What is claimed is:

1. A game playing method executed by a computer apparatus having a pointing device which is capable of simultaneously inputting a moving direction and magnitude of a pointer through one operation of the pointing device by a player and further capable of receiving an input of a signal at a timing of a given operation of the pointing device by the player, the method comprising:

displaying a predicted position of an object image which appears at a random timing and position, according to a position of the pointer moved by the player via the pointing device;

enabling an action to the object image at an input timing of the signal received via the pointing device;

judging a degree of success of the action depending on an overlap state between the predicted position and the object image at the time of the action;

changing a size of the predicted position depending on at least one of the total number of times of the actions and the total degree of success of actions; and giving a game award to the player depending on the total degree of success of the actions.

2. The method of claim 1, wherein the pointer is displayed in real time at a position intended by the player using the pointing device, and the predicted position follows movement of the displayed pointer.

3. A game playing method executed by a computer apparatus having a pointing device which is capable of simultaneously inputting a moving direction and magnitude of a pointer through one operation of the pointing device by a player and further capable of receiving an input of a signal at a timing of a given operation of the pointing device by the player, the method comprising:

displaying a first and a second character from a viewpoint located at the back of the second character, said first character forcing out an object thing in a random course at a random speed, said second character assuming a given action to the object thing coming from the first character;

displaying a predicted position to take the given action against the object thing coming from the first character, in response to movement of the pointer moved by the player via the pointing device;

causing the second character to take the given action against the object thing at an input timing of the signal received via the pointing device;

judging a degree of success of the given action depending on an overlap state between the predicted position and the object thing at the time of the given action;

changing a size of the predicted position depending on at least one of the total number of times of taking the given action and the total degree of success of the given actions; and giving a game award to the player depending on the total degree of success of the given actions.

4. The method of claim 3, wherein the pointer is displayed in real time at a position intended by the player using the pointing device, and the predicted position follows movement of the displayed pointer.

5. The method of claim 3, wherein the first character is a pitcher character, the second character is a batter character, and the object thing is a ball thrown by the pitcher character, and wherein after setting the predicted position, the batter character swings a bat for hitting the ball at the input timing of the signal.

6. A game playing method executed by a plurality of computer apparatuses each having a means for executing a given game program and further having a pointing device which is capable of simultaneously inputting a moving direction and magnitude of a pointer through one operation of the pointing device by a player and further capable of receiving an input of a signal at a timing of a given operation of the pointing device by the player, and further by a server apparatus performing two-way communication with each of the computer apparatuses via a network, the method comprising:

delivering the game program to each of the computer apparatuses from the server apparatus;

executing the game program by at least one of the computer apparatuses to display a first and a second character from a viewpoint located at the back of the second character, said first character forcing out an object thing in a random course at a random speed, said second character assuming a given action to the object thing coming from the first character, to display a predicted position to take the given action against the object thing coming from the first character, in response to movement of the pointer moved by the player via the pointing device, to cause the second character to take the given action against the object thing at an input timing of the signal received via the pointing device, to judge a degree of success of the given action depending on an overlap state between the predicted position and the object thing at the time of the given action, and to send a judgement result on the degree of success of the given action to the server apparatus along with identification information of the player; and totalizing, by the server apparatus, a plurality of judgment results to derive the total result per player, thereby to produce a game ward to be given to each player whose total result deserves the game award.

7. The method of claim 6, wherein the pointer is displayed in real time at a position intended by the player using the pointing device, and the predicted position follows movement of the displayed pointer.

8. The method of claim 6, wherein the first character is a pitcher character, the second character is a batter character, and the object thing is a ball thrown by the pitcher character, and wherein after setting the predicted position, the batter character swings a bat for hitting the ball at the input timing of the signal.

9. The method of claim 6, wherein the server apparatus stores the total result per player in a memory, and wherein when one of the players accesses the server apparatus using a computer apparatus other than the previous computer apparatus, the server apparatus reads the total result of said one of the players from the memory.

10. The method of claim 6, wherein the server apparatus causes the computer apparatus to display a page image in which a given item is buried invisible to the player, and to perform a process to enhance the degree of success of the given action by the second character after the player acquires the given item.

11. A game computer apparatus comprising:

a pointing device which is capable of simultaneously inputting a moving direction and magnitude of a pointer through one operation of the pointing device by a player and further capable of receiving an input of a signal at a timing of a given operation of the pointing device by the player;

a program acquiring means for acquiring a given game program from a server apparatus connected to the game computer apparatus via a network and for storing the acquired game program into a memory;

a program executing means for executing the game program read from the memory to display a first and a second character from a viewpoint located at the back of the second character, said first character forcing out an object thing in a random course at a random speed, said second character assuming a given action to the object thing coming from the first character, to display a predicted position to take the given action against the object thing coming from the first character, in response to movement of the pointer moved by the player via the pointing device, to cause the second character to take the given action against the object thing at an input timing of the signal received via the pointing device, and to judge a degree of success of the given action depending on an overlap state between the predicted position and the object thing at the time of the action; and a game result processing means for sending a judgement result on the degree of success of the given action to the server apparatus along with identification information of the player and for acquiring a game ward produced by the server apparatus based on the total judgement result derived by the server system by totalizing a plurality of judgement results.

12. A computer-readable storage medium storing program codes which cause a computer apparatus having a pointing device capable of simultaneously inputting a moving direction and magnitude of a pointer through one operation of the pointing device by a player and further capable of receiving an input of a signal at a timing of a given operation of the pointing device by the player, to execute:

displaying a first and a second character from a viewpoint located at the back of the second character, said first character forcing out an object thing in a random course at a random speed, said second character assuming a given action to the object thing coming from the first character;

displaying a predicted position to take the given action against the object thing coming from the first character, in response to movement of the pointer moved by the player via the pointing device;

causing the second character to take the given action against the object thing at an input timing of the signal received via the pointing device;

judging a degree of success of the given action depending on an overlap state between the predicted position and the object thing at the time of the action;

changing a size of 'the predicted position depending on at least one of the total number of times of taking the given action and the total degree of success of the given actions; and giving a game award to the player depending on the total degree of success of the given actions.

13. The storage medium of claim 12, wherein the degree of success of the given action is judged based on a probability value which is determined according to an ability value of the player registered in advance and which is updatable.

14. The storage medium of claim 12, wherein the program codes cause the computer apparatus to display the pointer in real time at a position intended by the player using the pointing device, and to control the predicted position to follow movement of the displayed pointer.

15. The storage medium of claim 12, wherein the computer apparatus is a personal computer and the pointing device is one of a mouse, a portable track ball and a portable slide pad.

* * * * *